(No Model.)
H. FORBES.
MEANS FOR PUMPING OIL WELLS.
No. 330,973. Patented Nov. 24, 1885.
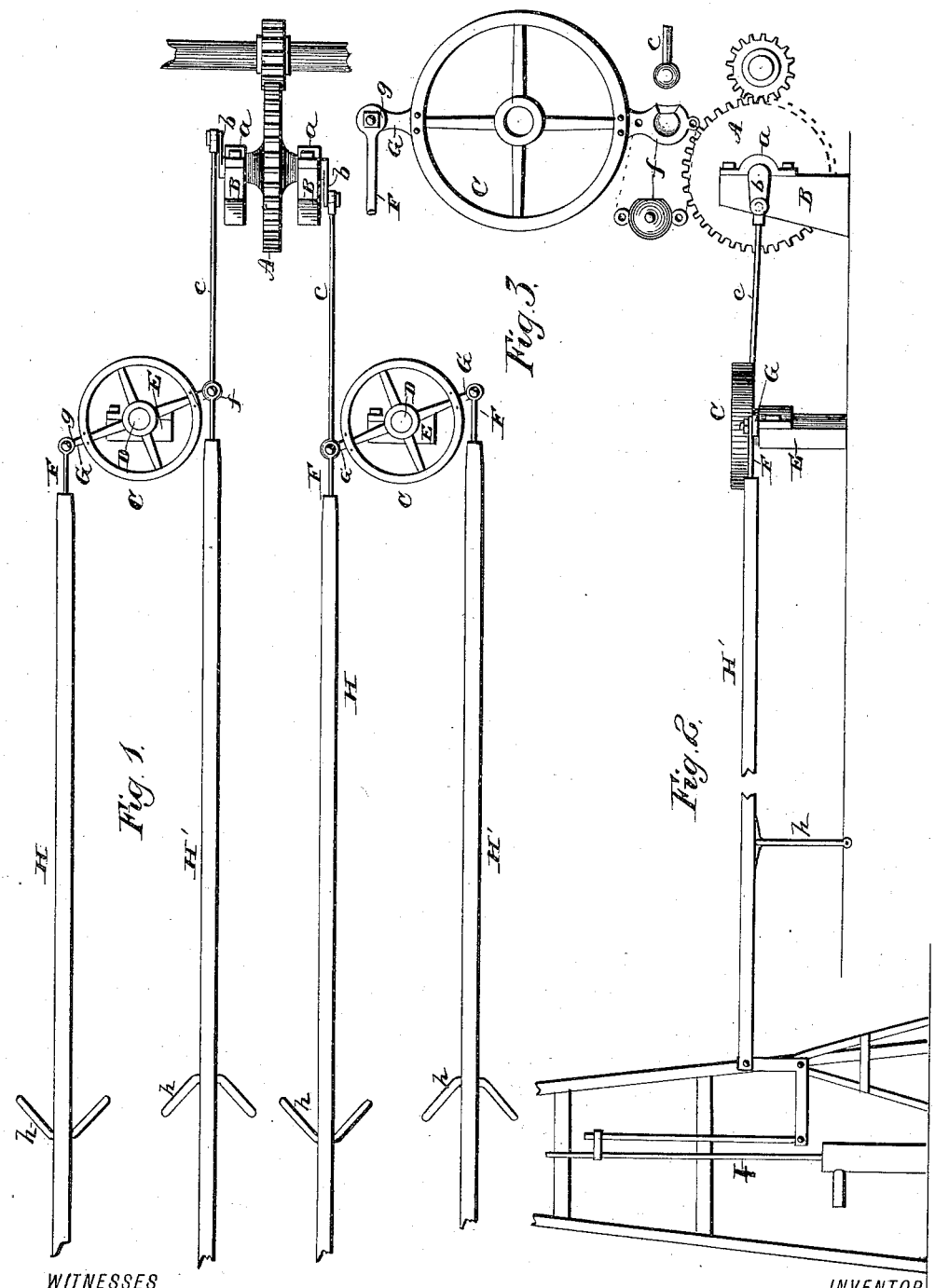
WITNESSES
Geo. F. Downing
S. G. Nottingham
INVENTOR
Henery Forbes.
By Suggett & Suggett
ATTORNEY

United States Patent Office.

HENERY FORBES, OF FRANKLIN, PENNSYLVANIA.

MEANS FOR PUMPING OIL-WELLS.

SPECIFICATION forming part of Letters Patent No. 330,973, dated November 24, 1885.

Application filed December 23, 1884. Serial No. 151,038. (No model.)

*To all whom it may concern:*

Be it known that I, HENERY FORBES, of Franklin, in the county of Venango and State of Pennsylvania, have invented certain new and useful Improvements in Means for Pumping Oil-wells; and I do hereby declare the following to be a full, clear, and exact description of the invention, such as will enable others skilled in the art to which it appertains to make and use the same.

My invention relates to an improvement in means for pumping oil-wells, the object of the same being to provide a pump-actuating system in which the strain upon the driving-wheel shall be uniform, the trouble from dead-centers abolished, and the rock-wheels adapted to actuate any desired number of rods and in any desired directions, a further object being to provide a system for operating oil-pumps which shall be economical, simple, and durable; and with these ends in view my invention consists in certain features of construction and combinations of parts, as will be hereinafter described, and pointed out in the claim.

In the accompanying drawings, Figure 1 is a plan view of the system. Fig. 2 is a view in side elevation, and Fig. 3 is a detached view of a rock-wheel and one form of a connecting-arm.

A represents the drive-wheel, toothed and actuated by a pinion on the engine-shaft, or provided with a smooth rim and driven by a band from the engine-shaft, as may be found most desirable. The wheel A is mounted in a suitable bearing, $a$, secured to a supporting-frame, B, and is provided with cranks $b$, secured to each end of its axle, the cranks being set at right angles to each other. The cranks $b$ are connected by pitmen $c$ with the peripheries of two horizontally-rocking disks, wheels, or levers, C, whereby each of said disks, wheels, or levers is made to complete a forward and backward stroke during each revolution of the drive-wheel. The wheels C are preferably constructed with rims about three inches deep and spokes of sufficient size and number to give the wheel the necessary strength; but the wheel may consist of a solid disk or a series of concentric levers united at their juncture to form a hub. The wheels C are mounted on the upper ends of upright axles D, which latter are secured in any suitable manner to supporting-frames E. The wheels C are thus left exposed above their supporting-frames with nothing to obstruct the attachment or motion of a rod in any direction across their surfaces. The said wheels are provided at their peripheries with means for connecting any number of pump-actuating rods, F, that may be found desirable. In practice the number carries from ten to thirty, but may be more than the greater or less than the lesser of these numbers.

The means preferred for attaching the rods F consist of a series of short arms, G, provided with perforations or sockets $g$ in their outer ends, and with perforations for receiving bolts or other fastening devices at their inner ends for securing the arms to the wheel. The pitmen $c$ are preferably connected to the wheels C by means of ball-and-socket joints $f$.

H and H' represent two sets of rods, one set being attached to each of the rock-wheels C. The rods H and H' are supported at intervals along their course by uprights $h$, which have pivotal connections, whereby they are allowed a vibratory motion as the rods are reciprocated. The rods H H' may lead in any desired direction from the rock-wheels, and any number within the limits of the periphery of the wheel and power of the engine may be so attached. It is my purpose to attach the same number of rods to each wheel C and thereby render the strain on the cranks the same; and, furthermore, by observing the positions of the rods and uprights when one of the cranks is on its center it will be noticed that one half of the sucker-rods I operated by one of the wheels C are up and the other half down, while one half of the sucker-rods attached to the other wheel C are half-way up and the other half half-way down, thus completely compensating each other as far as the weight of the sucker-rods is concerned. Again, the weight of the actuating-rods H H' is no small item in long connections, and the position just described shows that these rods are in equilibrium throughout the entire revolution of the drive-wheel, thus keeping the strain constant.

The arrangement of the pitmen in my new construction—viz., the attachment of one to each of two independent wheels—obviates the strain on the bearings which has hitherto been objectionable, and the whole construction is simple and convenient.

It is evident that my system, as above described, is susceptible of many modifications without departing from the spirit and scope of my invention; hence I do not wish to limit myself strictly to the construction herein set forth.

I am aware that the opposite extending cranks of a drive-shaft have been connected to the opposite sides of a single horizontal working-wheel for the purpose of operating a series of pump-actuating rods, as shown in the Yates patent, No. 226,984, granted April 27, 1880, and hence make no claim to such construction.

Having fully described my invention, what I claim as new, and desire to secure by Letters Patent, is—

In a system for operating oil-pumps, the combination, with a drive-wheel and a pair of rock-wheels, of a pitman for independently connecting each rock-wheel with the drive-wheel, and pump-actuating rods connected to each of said rock-wheels in sets, substantially as set forth.

In testimony whereof I have signed this specification in the presence of two subscribing witnesses.

HENERY FORBES.

Witnesses:
GEO. ALLEN,
W. N. EMERY.